(No Model.)
F. W. ROBERTSHAW.
VALVE.
No. 372,641. Patented Nov. 1, 1887.
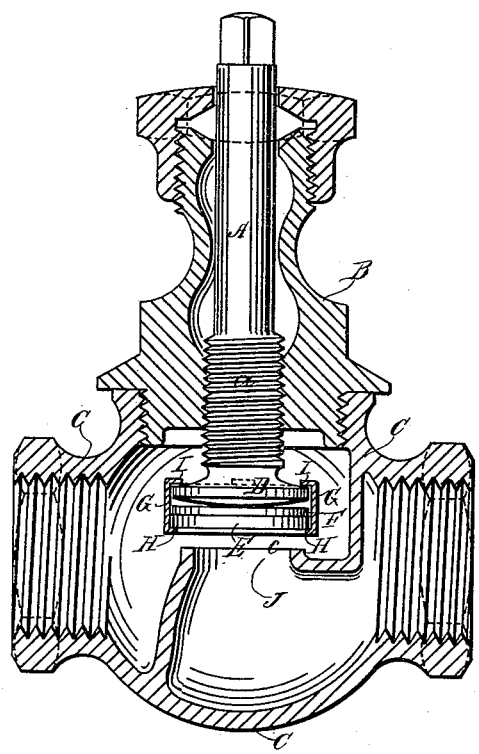
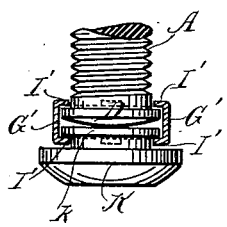
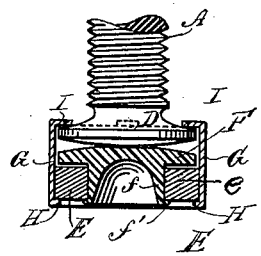
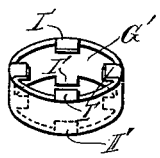
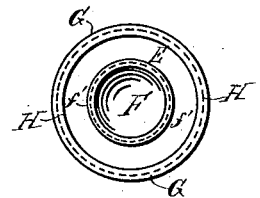
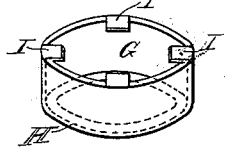
WITNESSES:
Wm. Martin
C. Sedgwick
INVENTOR:
F. W. Robertshaw
BY Munn & Co
ATTORNEYS.

UNITED STATES PATENT OFFICE.

FREDERICK W. ROBERTSHAW, OF PITTSBURG, PENNSYLVANIA.

VALVE.

SPECIFICATION forming part of Letters Patent No. 372,641, dated November 1, 1887.

Application filed March 12, 1887. Serial No. 230,644. (No model.)

*To all whom it may concern:*

Be it known that I, FREDERICK W. ROBERTSHAW, of Pittsburg, in the county of Allegheny and State of Pennsylvania, have invented a new and Improved Valve, of which the following is a full, clear, and exact description.

My invention relates to valves for controlling the passage through pipes of water, steam, gas, or other fluids, and has for its object to provide a simple, inexpensive, and efficient valve of this class, which will be self-adjusting to its seat at the passage for the fluid through the valve case or body when the spindle of the valve is operated, and will allow quick and easy repair of the valve by renewal of its seating disk or plug.

The invention consists in certain novel features of construction and combinations of parts of the valve, all as hereinafter fully described and claimed.

Reference is to be had to the accompanying drawings, forming a part of this specification, in which similar letters of reference indicate corresponding parts in all the figures.

Figure 1 is a sectional elevation of my improved valve fitted in a case or body to form a complete merchantable valve. Fig. 2 is a perspective view of the shell or retainer which holds the seating-face of the valve to the inner end or head of the spindle. Fig. 3 is a sectional side view of a modified form of the valve with its stem partly broken away. Fig. 4 is a face view of the valve shown in Fig. 3. Fig. 5 is a like view of another modified form of the valve, and Fig. 6 is a perspective view of a modified form of the valve-face retainer.

The valve is made with a spindle, A, preferably threaded at *a*, where it screws into the neck B of a valve case or body, C, and at its inner end the spindle has an enlarged head, D, which is preferably rounded or convexed at its outer side, which bears against the back of the seating-disk or plug-face of the valve.

As represented in Fig. 1 of the drawings, the seating-face of the valve is a vulcanized fiber or composition disk, E, between which and the rounded face of the spindle-head D a metal washer, F, is placed, and the three parts E F D are held in these relative positions by a retainer or shell, G, which loosely fits the margins of the parts, and is provided at one edge with an inturned or bent flange, H, which laps a little upon the outer face of the disk E, and at its other edge is provided with a series of lips or lugs, I, which, when the retainer is first made, are straight or about in a plane with the side wall of the retainer, and after the washer F and disk E are laid against the head D and each other the retainer will be slipped onto them with its lips I foremost, and when the flange H rests loosely against the disk the lips will be bent over toward or onto the back of the head D to complete the connection of the parts. The flange H allows the valve-face E to seat itself upon the raised seat or face *c* around the passage J, through which the fluid flows to the valve.

When the valves are large, I will form a flange, *f*, upon the lower side of the washer F and pass this flange through a hole, *e*, at the center of the composition or other seating face or disk E of the valve, and then upset the end or outer edge of the flange onto the outer face of the disk at *f'*, as shown clearly in Figs. 3 and 4 of the drawings, this overlapping of the flange *f* onto the valve-disk assisting the outer flange, H, of the retainer G in holding the disk or face E to place without interfering with the closure of the valve tightly to its seat by its portion between the two flanges H *f'*, as will readily be understood.

When the valve is fitted with a conical seating-plug, K, as shown in Fig. 5 of the drawings, I will use a retainer, G', having lips or lugs I' at each edge, so that when the inner end or face of the conical plug K is laid against the head D of the valve-spindle one set of the lips I' will be bent inward over the back of the head D, while the other set of lips I' will be bent inward into the annular groove on the reduced back part of the plug and outside of a collar, *k*, formed on the plug, whereby the plug will be held to the valve-spindle.

It is obvious that the seating disk or plug of the valve, when in the retainer, will always be free to turn on the spindle, and may have a limited rocking motion on the convex outer side or face of the spindle-head D; hence the disk or plug will be free to seat itself at the controlling-passage of a valve to which they may be fitted, with an assurance of a perfectly-tight closure of the valve, until the vulcanized-fiber seating-disk E is quite worn out by abrasion of the passing fluids or pressure on its seat; and a new disk may be easily and quickly fitted to place by simply turning up the lips I and inserting a new disk and bending the lips over again onto the back of the spindle-head. It will also be understood that when the seating-disk E in Fig. 1 is made of metal the metal washer F may be dispensed with, and the spindle-head will then bear directly onto the disk without injuring it, as it would the vulcanized-fiber disk were no protecting-washer employed.

Having thus fully described my invention, what I claim as new, and desire to secure by Letters Patent, is—

1. The combination of the valve casing having seat c, the valve-stem having head D, the subjacent and independent valve-facing, and the coupling-shell G, made in a single piece of cylindrical form and having flanges at the top and bottom of said cylinder, one set of which is made flexible and adapted to be bent in or out to retain or release the valve-face, substantially as shown and described.

2. The combination of the valve-casing having seat c, the valve-stem having head D, the valve-facing E, with washer interposed between it and the head of the stem, and the coupling-shell G, made in a single piece of cylindrical form, and having flanges at the top and bottom to retain the valve-face, washer, and the head D, one set of which lips or flanges is made flexible to adapt them to be bent in or out, as and for the purpose described.

3. The combination of the valve-casing having seat c, the valve-stem having head D, the annular valve-facing, the washer interposed between the valve-facing and the head D and extending down through the valve-facing, and the retaining-shell G, made in a single piece of cylindrical form, with flanges at the top and bottom, one set of which is made flexible, as and for the purpose described.

FREDERICK W. ROBERTSHAW.

Witnesses:
FRED MOORE,
SAML. FLOERSHEIM.